United States Patent
Goyal et al.

(10) Patent No.: US 12,354,164 B2
(45) Date of Patent: Jul. 8, 2025

(54) RESPONSE-TIME-BASED ORDERING OF FINANCIAL MARKET TRADES

(71) Applicant: Microsoft Technology Licensing, LLC, Redmond, WA (US)

(72) Inventors: Prateesh Goyal, Seattle, WA (US); Ilias Marinos, Athens (GR); Ranveer Chandra, Kirkland, WA (US); Mark Eugene Russinovich, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 237 days.

(21) Appl. No.: 18/046,806

(22) Filed: Oct. 14, 2022

(65) Prior Publication Data

US 2024/0127336 A1 Apr. 18, 2024

(51) Int. Cl.
*G06Q 40/04* (2012.01)
(52) U.S. Cl.
CPC .................................. *G06Q 40/04* (2013.01)
(58) Field of Classification Search
CPC ..................................................... G06Q 40/04
USPC ........................................................ 705/37
See application file for complete search history.

(56) References Cited

U.S. PATENT DOCUMENTS

| | | | |
|---|---|---|---|
| 10,229,453 B2 * | 3/2019 | Taylor | G06Q 40/06 |
| 10,929,930 B2 * | 2/2021 | Taylor | G06Q 40/04 |
| 2010/0094775 A1 * | 4/2010 | Waelbroeck | G06Q 40/04 |
| | | | 705/36 R |
| 2020/0342536 A1 * | 10/2020 | Bonig | G06Q 10/1093 |
| 2022/0108262 A1 * | 4/2022 | Cella | G06Q 10/063118 |

OTHER PUBLICATIONS

"Nasdaq and AWS Partner to Transform Capital Markets", Retrieved from: https://www.nasdaq.com/press-release/nasdaq-and-aws-partner-to-transform-capital-markets-2021-12-01, Nov. 30, 2021, 10 Pages.
Alizadeh, et al., "CONGA: Distributed Congestion-Aware Load Balancing for Datacenters", In Proceedings of the ACM Conference on SIGCOMM, Aug. 17, 2014, pp. 503-514.
Alizadeh, et al., "Data Center TCP (DCTCP)", In Proceedings of the ACM SIGCOMM Conference, Aug. 30, 2010, pp. 63-74.

(Continued)

*Primary Examiner* — Lindsay M Maguire
(74) *Attorney, Agent, or Firm* — Alleman Hall & Tuttle LLP

(57) ABSTRACT

Examples are disclosed that relate to fairly ordering financial market trades received from different market participant computers via a cloud computing network. In one example, a plurality of trades generated by a plurality of market participant computers are received. The trades are generated based at least on a financial market data point received by the plurality of market participant computers. Each trade is tagged with a delivery clock time stamp that tracks time in relation to financial market events that occur at a corresponding market participant computer. The trades are ordered based on the delivery clock time stamps and sent to a central exchange server computer. The central exchange server computer processes the trades.

16 Claims, 7 Drawing Sheets

(56) References Cited

OTHER PUBLICATIONS

Budish, et al., "The high-frequency trading arms race: Frequent batch auctions as a market design response", In The Quarterly Journal of Economics, vol. 130, Issue 4, Nov. 2015, pp. 1547-1621.
Firestone, et al., "Azure Accelerated Networking: SmartNICs in the Public Cloud", In Proceedings of the 15th Symposium on Networked Systems Design and Implementation, Apr. 9, 2018, pp. 51-64.
Geng, et al., "Exploiting a Natural Network Effect for Scalable, Fine-grained Clock Synchronization", In Proceedings of In15th USENIX Symposium on Networked Systems Design and Implementation, Apr. 9, 2018, pp. 81-94.
Ghalayini, et al., "Cloudex: a fair-access financial exchange in the cloud", In Proceedings of the Workshop on Hot Topics in Operating Systems, May 31, 2021, pp. 96-103.
Gmytrasiewicz, et al., "Decision-Theoretic Recursive Modeling and the Coordinated Attack Problem", In Proceedings of the First Conference of Artificial Intelligence Planning Systems, May 1, 1992.
Goyal, et al., "Backpressure flow control", In Proceedings of the 19th USENIX Symposium on Networked Systems Design and Implementation, Apr. 4, 2022, pp. 779-805.
Kristofersson, Alexander, "CME and Nasdaq move their markets to the cloud", Retrieved from: https://posttrade360.com/news/technology/cme-and-nasdaq-move-their-markets-to-the-cloud/, Dec. 20, 2021, 4 Pages.
Kumar, et al., "Swift: Delay is Simple and Effective for Congestion Control in the Datacenter", In Proceedings of the Annual conference of the ACM Special Interest Group on Data Communication on the applications, technologies, architectures, and protocols for computer communication, Aug. 10, 2020, pp. 514-528.
Lamport, Leslie, "Paxos Made Simple", In Journal of ACM Sigact News, vol. 32, Issue 4, Dec. 2001, 14 Pages.
Lamport, Leslie, "Time, Clocks, and the Ordering of Events In a Distributed System", In Journal of Communications of the ACM, vol. 21, Issue 7, Jul. 1978, pp. 558-565.
Li, et al., "HPCC: High Precision Congestion Control", In Proceedings of the ACM Special Interest Group on Data Communication, Aug. 19, 2019, pp. 44-58.
Li, et al., "Sundial: Fault-tolerant clock synchronization for datacenters", In Proceedings of the 14th USENIX Symposium on Operating Systems Design and Implementation, Nov. 4, 2020, pp. 1171-1186.
Mavroudis, et al., "Libra: Fair Order-Matching for Electronic Financial Exchanges", In Proceedings of the 1st ACM Conference on Advances in Financial Technologies, Oct. 2019, pp. 156-168.
Mittal, et al., "TIMELY: RTT-based Congestion Control for the Datacenter", In Proceedings of ACM Conference on Special Interest Group on Data Communication, Aug. 17, 2015, pp. 537-550.
Stoica, et al., "From Cloud Computing to Sky Computing", In Proceedings of the Workshop on Hot Topics in Operating Systems, May 31, 2021, pp. 26-32.
Zhu, et al., "Congestion Control for Large-Scale RDMA Deployments", In Journal of ACM SIGCOMM Computer Communication Review, vol. 45, Issue 4, Aug. 17, 2015, pp. 523-536.

\* cited by examiner

RESPONSE-TIME-BASED ORDERING OF FINANCIAL MARKET TRADES

BACKGROUND

Cloud computing providers have continuously improved the capabilities of data centers to provide better computing, networking, and storage resources to end user computers. These innovations have helped many industries forego the cumbersome task of building and maintaining on-premises data centers and move computing resources to cloud computing networks.

SUMMARY

Examples are disclosed that relate to fairly ordering financial market trades received from different market participant computers via a cloud computing network. In one example, a plurality of trades generated by a plurality of market participant computers are received. The trades are generated based at least on a financial market data point received by the plurality of market participant computers. Each trade is tagged with a delivery clock time stamp that tracks time in relation to financial market events that occur at a corresponding market participant computer. The trades are ordered based on the delivery clock time stamps and sent to a central exchange server computer. The central exchange server computer processes the trades.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
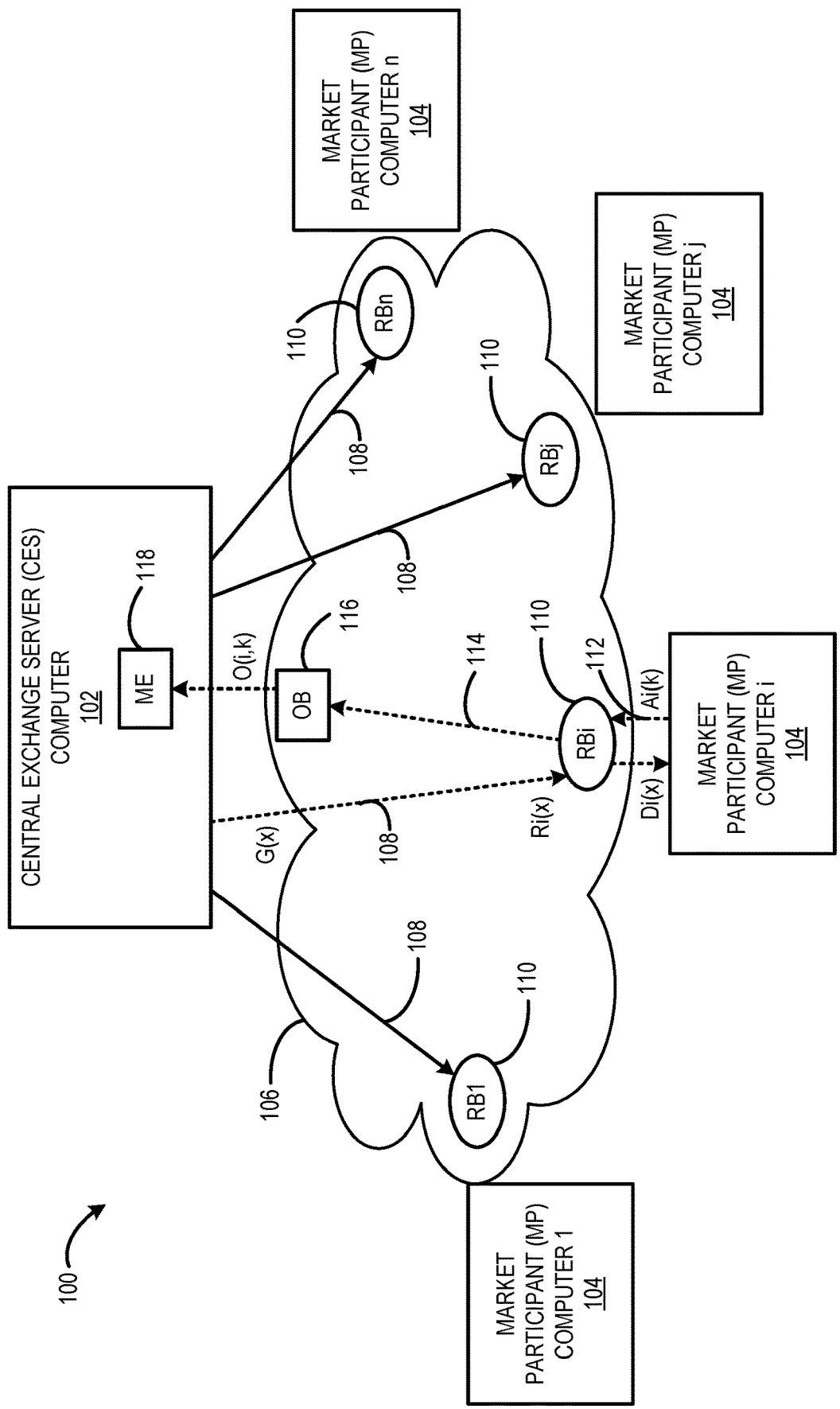
FIG. 1 shows an example cloud computing financial market system.

Despite all the innovation from cloud computing providers, in some cases, cloud computing networks are still not well suited for some industries. For example, financial market exchanges, such as NASDAQ, CME, and NYSE run central exchange server (CES) computers in on-premises data centers. At a high level, a CES computer generates financial market data and distributes the financial market data to various market participant (MP) computers in real time. Certain MP computers (commonly known as high-frequency traders), rapidly react to new financial market data issuing a high volume of transactions with the aim of submitting trade orders before other competitors.

To accommodate fair competition based on speed of trading, in some instances, financial exchanges offer simultaneous delivery of financial market data to interested MP computers, as well as ordered processing of trade transactions based on submission time (measured at the MP computer). However, such fairness is only provided to a fraction of the MP computers and comes at a premium cost. In some instances, financial exchanges offer collocation services for MP computers at the same data center as the financial exchange's CES computer. Such a collocated arrangement allows for equal bidirectional latency from the CES computer to all collocated MP computers. For other remote MP computers fairness of such kind is not available. Rather, the remote MP computers receive a financial market data stream and submit orders over variable-latency private or shared wide-area network (WAN) connections or through intermediate broker computers in a slower manner.

Financial exchanges are incentivized to move CES computers from on-premises data centers to cloud computing networks. As one example, cloud computing-implemented CES computers could rapidly increase market access to more participants, and also benefit from modern cloud computing's elastic resource scaling. To achieve smooth migration to a cloud computing network, a financial exchange's services need to be accommodated including fairness on speed trading, which presents unique challenges. As one example, ensuring fairness by providing deterministic equal latency to the MP computers in a manner similar to the on-premises data centers could be quite challenging for a CES computer implemented via a cloud computing network. Cloud computing data centers originally were designed for a heterogeneous, multi-tenant environment, aiming to accommodate diverse workloads. Using this traditional design, even if the MP computers are located within the same cloud region as the CES computer, latency between the CES computer and various MP computers cannot be guaranteed to be the same. Copper and fiber optics cables are not necessarily of equal length, network traffic is not evenly balanced among the different paths, multiple vendors' network elements have different performance characteristics, network oversubscription is still common in data centers, and network quality of service mechanisms for concurrent workloads are only best effort.

Various attempts have been made to solve the issue of fairness on speed trading for a CES computer implemented via a cloud computing network. In one example, high-precision clock synchronization is used to ensure that financial market data is released to MP computers simultaneously along with ordering trades based on submission time. However, in the event of latency spikes beyond a certain threshold, such an approach incurs unfairness. Cloud computing data centers do not guarantee bounded latency, and latency spikes (e.g., up to a few orders of magnitude increase than average) are quite frequent due to a multitude of reasons, such as congestion and link failures. In another example, incoming trade requests are ordered based on their contents. In yet another example, real-time financial market data is aggregated and delivered in batches to the MP computers and incoming trades corresponding to a batch are aggregated. However, these approaches impose significant restrictions as they require changes to how trades are processed by the CES computer.

Examples are disclosed that relate to a financial trade ordering approach that addresses the issue of providing fairness for a financial exchange system that is implemented via a cloud computing network. The approach recognizes that fairness is achieved by enforcing ordering of incoming trade requests based on a duration for each MP computer to react to the financial market data, i.e., the time taken to submit a trade since the reception of the financial market data. This duration is referred to herein in as the response time of the MP computer. The challenge in ordering reactive trades this way is that it is hard to measure response times since the CES computer does not know how the MP computer generated a specific trade (i.e., which financial market data packet triggered the trade).

To address this issue, the trade ordering approach employs the notion of "Delivery Clocks". Corresponding to each MP computer, a delivery clock is maintained that tracks the progress of financial market data delivery to the MP computer. Trades from different MP computers are ordered based on a delivery clock time stamp associated with each trade request in what is referred to as delivery-time-based ordering (DBO). In some examples, DBO is combined with controlling how these delivery clocks advance (i.e., pacing of the delivery clocks) to help account for delay variations in delivery of financial market data to different MP computers. Such DBO and control of delivery clock pacing enables the CES computer to achieve response time fairness across varying conditions (e.g., during latency spikes).

Contrary to the current modus operandi of financial exchanges, where fairness has limited scalability and comes at a premium, the herein described DBO approach does not rely on equal latency between the CES computer and various MP computers and provides the technical benefit of scaling to arbitrarily sized cloud computing data centers and even scales across multiple cloud computing data centers and cloud computing regions. Further, such an approach provides the technical benefit of being able to be implemented with different CES computers across different financial markets since the approach does not require any changes to the core algorithms used to process trades by those CES computers.

FIG. 1 shows an example cloud computing financial market system 100. The cloud computing financial market system 100 includes a central exchange server (CES) computer 102 and a plurality of market participant (MP) computers 104 in communication with the CES computer 102 via a cloud computing network 106. In some examples, one or more of the plurality of MP computers 104 is implemented as a physical computing device in the cloud computing network 106. In some examples, one or more of the plurality of MP computers 104 is implemented as a virtual machine in the cloud computing network 106.

The CES computer 102 generates a stream of real-time financial market data 108 and distribute the stream of real-time financial market data 108 (also referred to herein as financial market data) to the plurality of MP computers 104. The stream of real-time financial market data 108 may include any suitable information related to a financial instrument. In some examples, the stream of real-time financial market data 108 includes, for a particular instrument, the identifier of the instrument; where the instrument is traded, such as the ticker symbol and exchange code; the latest bid and ask price; and the time of the last-completed trade. In some examples, the real-time financial market data 108 includes other information, such as volume traded, bid, and offer sizes and static data about the financial instrument aggregated from a variety of sources. In some examples, the stream of real-time financial market data 108 allows the MP computers and associated investors to know the latest price and see historical trends for various financial instruments, such as equities, fixed-income products, derivatives, and currencies.

For each MP computer (e.g., 1, i, j, n) of the plurality of MP computers 104, a release buffer (RB) 110 is associated with the MP computer 104. For example, release buffer (RB1) is associated with MP computer 1, release buffer (RBi) is associated with MP computer i, and so on. Each release buffer 110 is controlled by the provider of the cloud computing network 106 and/or the CES computer 102. The release buffers 110 are not controlled by the MP computers 104, so that the MP computers do not have the ability to interfere with the timing and fairness of trades in the cloud computing financial market system 100. Each release buffer 110 receives the stream of real-time market data 108 directly from the CES computer 102. The release buffer 110 determines when the received financial market data 108 is released to the corresponding MP computer 104. In other words, the release buffer 110 paces the delivery of the financial market data 108 to the MP computer 104. In some examples, the release buffer 110 controls pacing of delivery of the financial market data 108 to the market participant computer 104 to satisfy fairness conditions of a pacing algorithm. The release buffer 110 may employ any suitable pacing algorithm to maintain fairness. Various pacing algorithms are discussed in further detail herein.

Compared to an on-premise deployment, the cloud computing financial market system 100 employs the release buffers 110 for correctness in trade ordering. In the cloud computing implementation, the release buffers 110 are included in the trusted infrastructure of the cloud computing network 106—i.e., the MP computers 104 do not control or have influence over the release buffers 110. The release buffers 110 are positioned suitably close enough to the MP computers 104, so that latency between a release buffer 110 and an associated MP computer 104 does not impact fairness of trade ordering.

In some examples, the release buffer 110 is incorporated into an intermediate computing device in communication with the CES computer 102 and the associated MP computer 104 via the cloud computing network 106. In some examples, the operator of the cloud computing network 106 provides the facilities and/or hardware that enables the functionality of the release buffers 110. In some examples, the release buffers 110 are incorporated into hypervisors of cloud nodes of the cloud computing network 106 that host the MP computers 104. In some examples, the release buffers 110 are incorporated into programmable network interface cards (NICs) of such cloud host nodes. Incorporating the release buffers 110 into the devices operated by the cloud computing network 106 provides the technical benefit of providing fine-grained control over the cloud hardware/software stack that allows for the release buffers 110 to be protected against corruption.

In some examples, the release buffers 110 are virtual machines controlled by the CES computer 102 and placed proximate to the MP computers 104 with the help of the provider of the cloud computing network 106 to have low latency between the release buffer and MP computer. In such examples, the CES computer 102 has control over all of the cloud-based computing components (e.g., release buffers, ordering buffer) except for the MP computers. In this way, the CES 102 controls/manages all of the communication APIs between the different cloud-based computing components. Such an arrangement would allow for the provider of the cloud computing network 106 to offer the MP computer an application program to interface with the different cloud-based computing components.

In other examples, the release buffers 110 are incorporated into hardware of the associated MP computers 104 (although the release buffers 110 is not controlled by the associated MP computers 104). In some examples, the CES computer 102 and the MP computers 104 correspond to virtual machines owned by different parties.

Each MP computer 104 generates one or more trades 112 based on the financial market data 108 received from the associated release buffer 110 and submits the trade(s) to the corresponding release buffer 110. The release buffer 110 tags an incoming trade 112 from the MP computer 104 with additional ordering information for fair ordering of trades, such as a delivery clock time stamp, to generate a tagged trade 144. Further, the release buffer 110 sends the tagged trade 114 to an ordering buffer (OB) 116 via the cloud computing network 106. The ordering buffer 116 orders incoming trades received from the plurality of MP computers 104 based on the tagged ordering information (e.g., delivery clock time stamps) included in the tagged trades 114. Further, the ordering buffer 116 forwards the tagged trades 114 to the CES computer 102 for processing as ordered based on the delivery clock time stamps. In one example, a matching engine (ME) 118 of the CES computer 102 processes the trades by matching buy orders against selling orders and executes matched trade orders.

In some examples, the ordering buffer 116 is incorporated into an intermediate computing device in the cloud computing network 106 in communication with the CES computer 102 and the release buffers 110 and/or the associated MP computers 104. In such examples, the ordering buffer 116 is implemented without changing the underlying operation and/or the core algorithms used to process trades by the CES computer 102. In some examples, the ordering buffer 116 is implemented as a virtual machine in the cloud computing network 106. In other examples, the ordering buffer 116 is incorporated into the CES computer 102.

The illustrated example shows a trade operation that is performed by MP computer i. In the illustrated example, x refers to a $x^{th}$ financial market data point and (i,k) refers to the $k^{th}$ trade received from MP computer i. Further, $G(x)$ refers to the real time at which x was generated at the CES computer 102. $Ri(x)$ refers to the real time at which x was received at release buffer i (RBi) from the CES computer 102. $Di(x)$ refers to the real time at which x was delivered by the release buffer (RBi) to the MP computer i. $Ai(k)$ (RBi) refers to the real time at which trade (i,k) was submitted by MP computer i to release buffer RBi. $fi(k)$ (not shown) is a financial market data point used to generate trade (i,k). This financial market data point (e.g., function) is not known to any other computer besides MP computer i. $rti(k)$ refers to the response time of trade (i,k). In this example, the response time $rti(k)=Ai(k)-Di(fi(k))$. Further, $O(i,k)$ refers to the order in which the ordering buffer 116 forwards trades to the matching engine 118. In the illustrated example, if $O(i,k)<O(j,l)$ then trade (i,k) is ordered before trade (j,l).

In the illustrated example, each release buffer 110 is located sufficiently close to the associated MP computer 104 such that latency between the release buffer 110 and the associated MP computer 104 pair does not impact fairness. In some examples, messages between a release buffer 110 and the CES computer are delivered in-order using a reliable transport protocol, such as TCP, and connection disruptions can be handled using timeouts.

An approach that leverages clock synchronization for fairness delivers financial market data point x simultaneously to all MP computers at a pre-specified threshold time (Th) from generation time—i.e., $Di(x)=\max(Ri(x),G(x)+Th)$. Incoming trades are simply processed in the order of submission time ($O(i,k)=Ai(k)$). However, according to this ordering scheme, a MP computer experiences unfairness if the latency between the CES computer 102 and the MP 104 computer 104 goes beyond the threshold time (Th) and the market data point is delivered to the MP computer 104 later than intended.

In contrast, the trade ordering approach based on response time (e.g., DBO) measures time intervals locally between each release buffer 110 and the associated MP computer 104. These time intervals are referred to herein as inter-delivery times. In some examples, each release buffer 110 uses its own local clock as long as the clock drift rate of the local clock is small (e.g., <0.02%).

The ordering buffer 116 employs DBO to improve fairness relative to other ordering approaches (e.g., an ordering approach that relies on clock synchronization alone). Competing MP computers 104 make trade decisions directly in response to the same market data stream 108. Events corresponding to the delivery of the same market data point to different MP computers 104, thus, relate to the same conceptual event. In some examples, each release buffer 110 maintains a separate locally maintained logical delivery clock to track these conceptual events. In some examples, the logical delivery clock is represented by a lexicographical tuple that increases monotonically with time. For example, a delivery clock at RBi at time t is given by, $DCi(t)=(xl(t), t-Di(xl(t)))$. where $xl(t)$ is the latest data point that was delivered to MPi (i.e., $Di(xl(t)) \le t < Di(xl(t)+1)$). Interval, $t-Di(xl(t))$, corresponds to the time that has elapsed since the latest delivery. This delivery clock tuple tracks the progress of market data delivery to the corresponding MP computer.

In one example, the DBO satisfies the following fairness condition, $O(i,k)=DCi(Ai(k))$. With DBO, trades are ordered based on the release buffer 110 delivery clock time at trade submission. In other words, DBO orders trades from MP computers relative to when those MP computers received the financial market data. DBO can be thought of as a post hoc way of correcting for time differences in delivery of market data to different MP computers. For example, if market data delivery to a particular MP computer lags behind other MP computers (e.g., due to a latency spike), then the delivery clock also lags behind. Compared to ordering trades based on the submission time, with DBO, trades from this MP computer receive a boost in ordering that can correct for the late delivery.

Although the delivery-time-based ordering approach is discussed in the context of a cloud computing financial market system, the concepts discussed herein are broadly applicable to other types of cloud computing systems. In one example, the delivery-time-based ordering approach is employed in a cloud-based gaming application to fairly order requests generated by different gaming client computers based on receiving a data point from a gaming server computer. In one example of such a gaming implementation, release buffers are associated with the gaming client computers and an ordering buffer acts as an intermediary for fairly ordering requests that are sent to the gaming server computer to be fulfilled. In another example, the delivery-time-based ordering approach is employed in cloud-based advertising exchange. In yet another example, the delivery-time-based ordering approach is employed in a cloud-based auction exchange.

Figure 2:
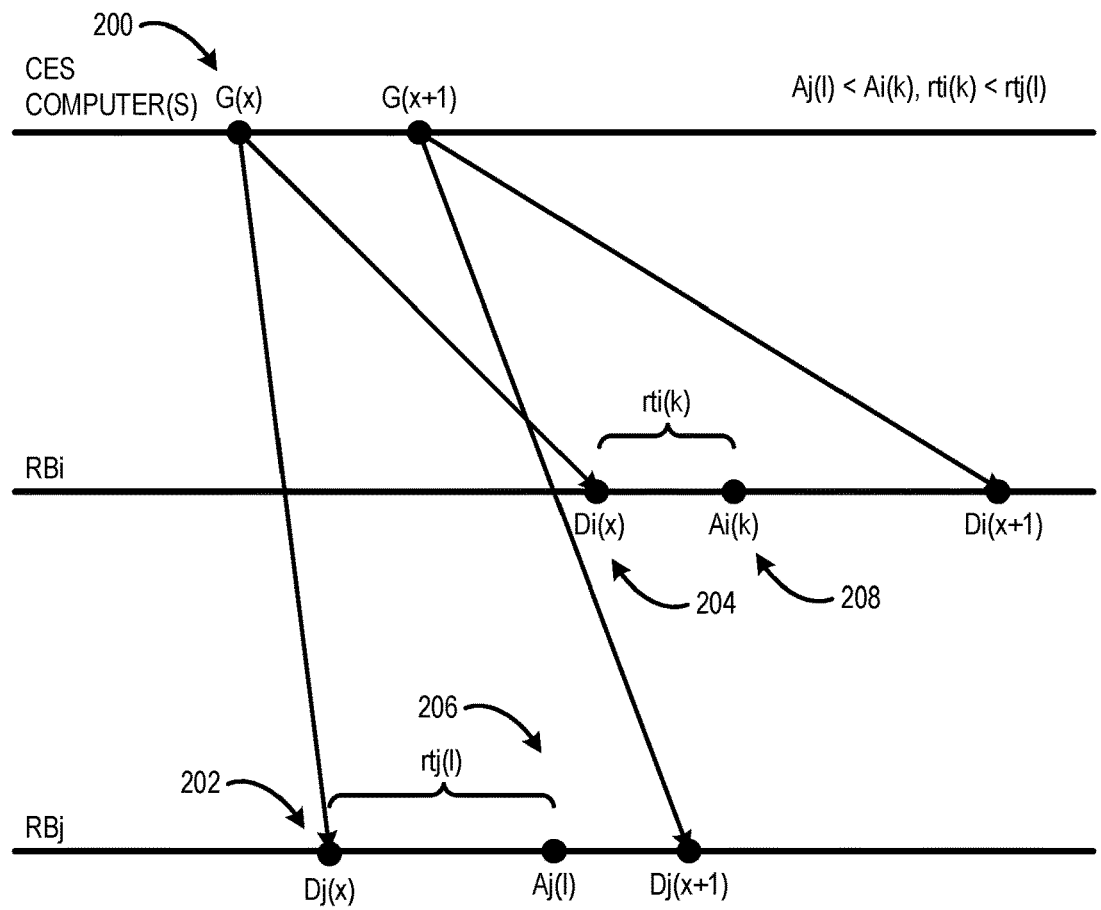
FIG. 2 shows an example financial trade scenario that employs a delivery time-based trade ordering scheme.

FIG. 2 shows an example financial trade ordering scenario that employs DBO. At 200, a financial market data point x is generated by the CES computer at time G(x). At 202, the financial market data point x is received by the release buffer (RBj) associated with MP computer j at time Dj(x). At 204, the financial market data point x is received by the release buffer (RBi) associated with MP computer I at time Di(x). In this example, the delivery of financial market data point x to MP computer i lags behind the delivery of financial market data point x to MP computer j.

MP computer j generates trade (j,l) based on receiving the financial market data point x at time Dj(x). At 206, the release buffer (RBj) receives the trade (j,l) at time Aj(l). The response time rtj(l) of MP computer j for trade (j,l) is Aj(l)-Dj(x). The release buffer (RBj) tags trade (j,l) with the response time rtj(l) and forwards the tagged trade to the ordering buffer 116. Further, MP computer i generates trade (i,k) based on receiving the same financial market data point x at time Di(x). At 208, the release buffer (RBi) receives the trade (i,k) at time Ai(k). The response time rti(k) of MP computer i for trade (i,k) is Ai(k)-Di(x). The release buffer (RBi) tags trade (i,k) with delivery clock time $DCi(Ai(k))=<x, rti(k)>$ and forwards the tagged trade to the ordering buffer 116. In this example, trade (j,l) is submitted to the ordering buffer 116 before trade (i,k), but the response time rti(k) of trade (i,k) is less than the response time rtj(l) of trade (j,l). Accordingly, the ordering buffer 116 orders trade (i,k) ahead of trade (j,l). With DBO, $O(i,k)(=<x,rti(k)>)<O(j,l)(=<x,rtj(l)>)$ and trade (i,k) is correctly ordered ahead of (j,l). If this same example were handled using ordering based on submission time, trade (j,l) would be incorrectly ordered ahead of trade (i,k) even though MP computer i had the faster response time.

In one example, the CES computer 102 generates a market data point every 10 microseconds starting at t=0 and each release buffer forwards the market data point to the corresponding MP computer without delay. In this example, RBj is 10 microseconds away from the CES computer 102 and RBi is 40 microseconds away from the CES computer 102. The delivery clock for RBj advances like so: t=0, DC=<0,0>; t=9, DC=<0, 9>; t=10 DC=<1, 0>; t=19 DC=<1, 9>; t=20 DC=<2, 0>; and so on. On the other hand, the delivery clock for RBi advances like so: t=0, DC=<0,0>; t=39, DC=<0, 39>; t=40 DC=<1, 0>; t=49, DC=<1, 9>; t=50, DC=<2, 0>; and so on. If RBj reacts to a financial market data point received from the CES computer 102 in 15 microseconds, then RBj submits a trade at t=25, DC=<2,5>. If RBi reacts to the same financial market data point received from the CES computer 102 in 5 microseconds, then RBi submits a trade at t=45, DC=<1,5>. In this example, RBi's delivery clock time stamp is less than RBj's delivery clock time stamp even though RBi's trade is generated after RBj's trade in real time due to the difference in latency. The ordering buffer 116 orders RBi's trade ahead of RBj's trade since RBi's trade has a lower delivery clock time stamp than RBj's trade.

DBO improves fairness by correcting differences in market data delivery across different MP computers. In different examples, the CES computer 102 employs different requirements for achieving different variants of fairness. At a high level, each fairness variant requires trades generated by different MP computers 104 based on the same financial market data information are ordered based on the response time of the MP computers.

More stringent fairness correction requires measuring the response time of a trade. The challenge, however, is that a trade could be generated in response to any market data point delivered to a MP computer (and not just the latest data point). The release buffer 110 and/or the ordering buffer 116 cannot rely on the MP computer to offer such information, since the MP computer is not controlled by the same entity. However, this issue can be alleviated by enforcing certain restrictions on how the delivery clocks advance across the release buffers 110 associated with the different MP computer 104. In other words, the release buffers 110 can place restrictions on the pace of market data delivery to the MP computers 104.

In one example, a trade ordering scheme O is strongly fair if it satisfies the following fairness conditions, C1: If $Ai(k)<Ai(l)$, then, $O(i,k)<O(i,l)$. C2: If $fi(k)=fj(l) \wedge rti(k)<rtj(l)$, then, $O(i,k)<O(j,l)$. Condition C1 states that a MP computer is always better-off submitting the trade order as early as possible. C2 states that trade orders generated based on the same market data point should be ordered based on the response time of the MP computers. The fairness conditions on the delivery processes for strongly fair ordering are given by, $Di(x+1)-Di(x)=Dj(x+1)-Dj(x)$, $\forall i, j, x$. For strong fairness the inter-delivery times should be the same across all MP computers. In other words, the delivery clocks at all release buffers (RBs) at any given delivery clock time must advance at the same rate. To prove that the above condition is necessary we will show that if this condition is not met then no ordering process exists which is strongly fair for arbitrary trade orders.

Figure 3:
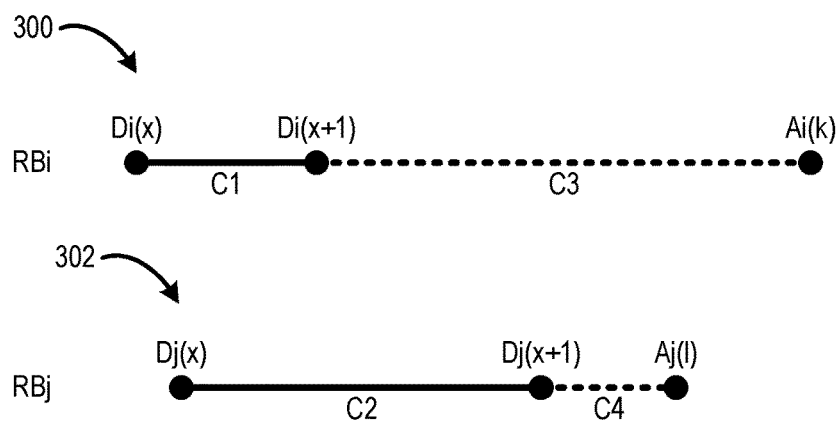
FIG. 3 shows an example scenario that proves which fairness conditions are necessary to achieve ideal response time fairness for a delivery time-based trade ordering scheme.

FIG. 3 shows an example scenario where the above condition is not met. At 300, $Di(x+1)-Di(x)=c1$. At 302, $Dj(x+1)-Dj(x)=c2$. Without loss of generality it is assumed that c1<c2. Consider hypothetical trades (i,k) and (j,l) s.t. $Ai(k)=Di(x+1)+c3$ and $Aj(l)=Dj(x+1)+c4$. Further, it is assumed in this scenario that Ai(k) and Aj(l) s.t. c3>c4 and c1+c3<c2+c4. These two scenarios are indistinguishable at the ordering buffer 116. Case 1: $fi(k)=fj(l)=x+1$. Here, $rti(k)=c3, rtj(l)=c4$. Since c3>c4, a strongly fair ordering (condition C2) must satisfy, $O(i,k)>O(j,l)$. Case 2: $fi(k)=fj(l)=x$. Here, $rti(k)=c1+c3, rtj(l)=c2+c4$.) In this case, since c1+c3<c2+c4, a strongly fair ordering must instead satisfy the opposite, $O(i,k)<O(j,l)$, which is a contradiction. Thus, no ordering process can be strongly fair in both these scenarios. However, if the inter-delivery times are the same across MP computers, then a strongly fair ordering exists. Assuming the same inter-delivery times, DBO satisfies C1. DBO also satisfies C2, i.e., if $fi(k)=fj(l) \wedge rti(k)<rtj(l)$, then, $DCi(Ai(k))<DCj(Aj(l))$. This is because financial market data fi(k)(=fj(l)) is delivered to each of the MP computers at the same delivery clock time (by definition). Further, delivery clocks advance at the same rate across all MP computers. When measured from the delivery of fi(k)(=fj(l)), delivery clock of RBj in duration rtj(l) will advance more than delivery clock of RBi in duration rti(k). Therefore, DBO is strongly fair.

In another example, a trade ordering scheme O ensures limited fairness if it satisfies C1: If $Ai(k)<Ai(l)$, then, $O(i,k)<O(i,l)$, and the following condition, C3: If $fi(k)=fj(l) \wedge rti(k)<rtj(l) \wedge rti(k)<\delta$, then, $O(i,k)<O(j,l)$. In C3, δ is a positive constant. Condition C3 states that if the response time of a MP computer is bounded, then the trades generated by the MP computer will be ordered ahead of corresponding trades from other MP computers as long as the MP computer generates the trades faster than the other MP computers. This limited fairness variant is relevant to high frequency trading scenarios where the response time is in the order of a few microseconds. In one example, the limited ordering scheme abides by Corollary 1: the fairness conditions on the delivery processes for limited fairness are given by, if $Di(x+1)-Di(x) < \delta$, then, $Dj(x+1)-Dj(x) = Di(x+1)-Di(x)$, $\forall j$. Compared to strong fairness, the above condition offers some leeway for how the delivery clocks can advance. If for a certain MP computer, the inter-delivery time for two consecutive data points is greater than or equal to $\delta$, then for any other MP computer, the inter-delivery for these points can differ as long as it is greater than S. This limited fairness variant provides the technical benefit of maintaining fairness while dealing with sudden latency spikes.

In yet another example, a trade ordering scheme O is approximately fair if it satisfies C1: If $Ai(k) < Ai(l)$, then, $O(i,k) < O(i,l)$, and the following condition, C4: If $fi(k) = fj(l)/\text{rti}(k)$ $(1+E) < rtj(l)$, then, $O(i,k) < O(j,l)$. In C4, E is a positive constant. C4 states that as long as a MP computer is faster than other MP computers by a certain margin, the trades generated by the MP computer will be ordered ahead of trades generated by the other MP computers. In one example, the approximate ordering scheme abides by Corollary 2: the fairness conditions on the delivery processes for approximately fair ordering are given by, $Di(x+1)-Di(x) < (Dj(x+1)-Dj(x)) \cdot (1+\epsilon)$, $\forall i, j, x$. Compared to strong fairness, the above condition also offers some leeway for inter-delivery times to differ. This leeway can be useful for masking fluctuations in latency. Note that for the limited and approximate fairness variants, the release buffers (RBs) 110 only need to ensure the specified constraints for inter-delivery times in each case. Ensuring these constraints does not require clock synchronization across the release buffers 110. In some examples, a release buffer 110 can use its own local clock for maintaining inter-delivery times (as long as the clock drift rates are relatively small).

Figure 4:
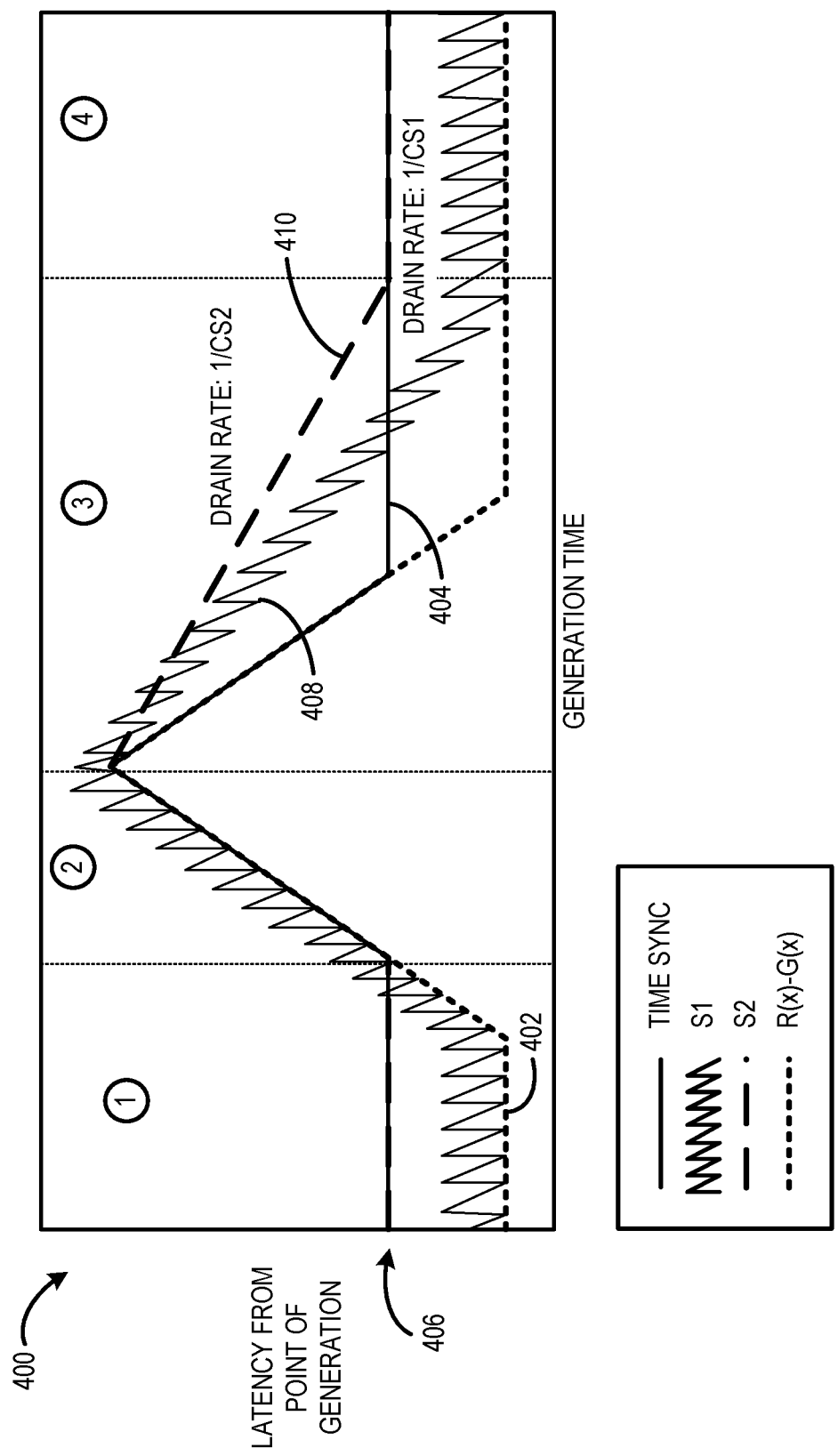
FIG. 4 shows an example graph indicating behavior of different market data pacing algorithms based on a transient spike in latency.

FIG. 4 shows a graph 400 indicating how different pacing algorithms for controlling fairness behave in a scenario where a transient spike in latency between the CES computer 102 and a particular MP computer occurs. In particular, the graph 400 indicates delivery times provided by different pacing algorithms for the particular MP computer. The x-axis of the graph 400 plots the generation time of financial market data. The y-axis of the graph 400 plots the delivery times relative to the generation time for market data points (i.e., $Di(x)-G(x)$ for the different trade ordering schemes).

The latency 402 from the CES computer to the MP computer is indicted by the dotted line. The latency 402 from the CES computer to the MP computer is initially constant and then increases to a peak forming a spike. The latency 402 from the CES computer to the MP computer decreases from the peak of the spike back to the initial constant level.

Behavior of a time synchronization-based pacing algorithm 404 is indicated by the solid line. The time synchronization-based pacing algorithm assumes that timing is synchronized among all release buffers corresponding to all MP computers and trades are ordered based on the order in which they are received at the CES computer 102. The time synchronization-based pacing algorithm 404 acts fairly as long as the latency 402 remains below a threshold 406. However, once the latency 402 exceeds the threshold 406 market data is not delivered simultaneously to all MP computers and fairness of the time synchronization-based pacing algorithm 404 is reduced. Once the latency 402 has peaked and begins to decrease, the time synchronization-based pacing algorithm 404 dictates that the release buffer drains the generated trades at a rate consistent with the drop in latency 402. Under these conditions, the time synchronization-based pacing algorithm 404 continues to have reduced fairness until the latency falls below the threshold 406. In this case, the fairness of the time synchronization-based pacing algorithm 404 is negatively affected by the transient spike in latency.

Behavior of a first DBO pacing algorithm (S1) 408 is indicated by the sawtooth line in the graph 400. For the first DBO pacing algorithm (S1) 408, the inter-delivery times respect the constraints in Corollary 1 having fairness conditions that specify if for a certain MP computer, the inter-delivery time for two consecutive data points is greater than or equal to 6, then for any other MP computer, the inter-delivery for these points can differ as long as it is greater than 6. In one example, according to the first DBO pacing algorithm (S1) 408, the CES computer 102 split the market data points into batches. At the release buffer 110, all the market data points corresponding to the same batch are delivered simultaneously (i.e., the inter-delivery time for market data points within a batch is zero). The time interval between delivery of two batches is greater than or equal to 6. Note that, as per Corollary 1, the inter-batch time at a MP computer can differ from other MP computers. As a result, the first DBO pacing algorithm (S1) 408 can handle arbitrary latency spikes without violating the inter-delivery constraints including the latency spike shown in the graph 400.

In some examples, delivery time of a batch b, $(Di(b))$, is given by, $Di(b) = \max(Ri(b), Di(b-1)+6)$, where $Ri(b)$ is the time at which the last market data point in b is received by RBi. In some examples, the CES computer 102 chooses the batch boundaries based on the generation time of the market data. In some examples, market data x corresponds to batch number $(b(x))$ given by $b(x) = \lfloor G(x)/CS1 \cdot \delta \rfloor$ or equivalently $CS1 \cdot \delta \cdot b(x) \leq G(x) < CS1 \cdot \delta \cdot (b(x)+1)$, where $CS1(>1)$ is a constant. Note that with the first DBO pacing algorithm (S1) 408 batches can be arbitrarily small and multiple batches can be outstanding within a round trip.

Note that the batch-based pacing of the pacing algorithm (S1) 408 is provided as a non-limiting example. In other examples, the pacing of delivery of financial market data points is controlled according to different fairness conditions to maintain approximate consistency in inter-delivery times across different MP computers.

Behavior of a second DBO pacing algorithm (S2) 410 is indicated by the dashed line in the graph 400. Note that regions of interest for the second DBO pacing algorithm (S2) 410 in the graph 400 are demarcated by dashed vertical lines. For the second DBO pacing algorithm (S2) 410, clock synchronization between release buffers is combined with DBO. In some examples, for the second DBO pacing algorithm (S2) 410, $Di(x) = \max(Ri(x), G(x)+Th, Di(x-1)+(G(x)-G(x-1))/CS2)$ where $CS2(>1)$ is a constant. The fairness conditions for the second DBO pacing algorithm (S2) 410 specify that if the network latencies for all of the MP computers 104 are below a threshold time Th consistently (i.e., regions 1 and 4 in the graph 400), then, the inter-delivery time at each MP computer is the same (equal to the inter-generation time, i.e., $Di(x) - Di(x-1) = G(x) - G(x-1), \forall i$). The delivery times thus respect the constraints and the second DBO pacing algorithm (S2) 410 provides strong fairness at such times. Compared to the pacing algorithm 404 that relies on clock synchronization alone, the main differentiation of the second DBO pacing algorithm (S2) 410 is how data delivery is handled after a latency spike occurs between the CES computer 102 and a particular MP computer (third term in the equation). In such cases (region 3 of the graph 400), the inter-delivery time differs from the inter-generation time by a relative factor (CS2) and $Di(x) - Di(x-1) = G(x) - G(x-1)CS2$. At such times, if the network latency to other MP computers remains consistently low, then the inter-delivery time gaps respect the fairness conditions listed in Corollary 2 (with $\epsilon$=CS2−1) and S2 provides approximate fairness. The inter-delivery time gaps at MP computers, however, can differ significantly when latency spikes happen (region 2 in the graph 400). In this case, fairness provided by the second DBO pacing algorithm (S2) 410 is potentially reduced due to a lack of consistency in inter-delivery times across different MP computers. However, the second DBO pacing algorithm (S2) 410 still uses DBO and still provides better fairness than the time synchronization-based pacing algorithm in region 2 of the graph 400. Moreover, the second DBO pacing algorithm (S2) 410 provides improved fairness for 'one-sided' trades under normal network conditions.

The herein-described pacing algorithms are provided as non-limiting examples. In other examples, different pacing algorithms with alternate fairness conditions to achieve fairness can be implemented depending on the desired properties of the application.

In some instances, the latency from the MP computers to the CES computer 102 could also be variable. In some implementations, such variations do not affect fairness as long as the ordering buffer 116 only forwards a trade (i,k) to the matching engine 118 once the ordering buffer 116 has received and forwarded all other trades (j,l) that should be ordered ahead of (i,k) (i.e., O(j,l)<O(i,k)). This requirement means that the ordering buffer 116 might need to delay received trades for a certain duration (buffering) before forwarding the trades to the matching engine 118. In one example, each release buffer 110 sends an acknowledgement (ACK) to the ordering buffer 116 for every market data point that the release buffer 110 delivers to the associated MP computer 104. ACKs and trades sent from each release buffer are delivered to the ordering buffer 116 in-order. An ACK from RB j for data x thus tells the ordering buffer 116 that it has received all trades (j,l) from MP computer j s.t., O(j,l)≤<x,0>. In some examples, the ordering buffer 116 uses a priority-queue to buffer trades received from the different MP computers 104. In some examples, the ordering buffer 116 uses the ACK information to forward trades respecting the above requirement. In one example, the ordering buffer 116 determines whether ACKs have been received from all MP computers that have a higher delivery clock time stamp than a time stamp of a trade at the head of priority queue. If so, then the ordering buffer 116 forward the ordered trades to the matching engine 118 of the CES computer 102.

In the event of release buffer failures, the ordering buffer 116 could stall indefinitely waiting for ACKs from a failed release buffer. In some examples, to protect against such scenarios, the ordering buffer 116 sends a trade to the matching engine 118 after a timeout threshold if not all ACKs have been received from the MP computers for a data point generated before the timeout threshold. Such a timeout threshold can also help reduce buffering at the ordering buffer 116 (at the cost of fairness) when the network latency from/to certain MP computers 104 is high.

In some implementations, a plurality of MP computers may be associated with a particular market participant. The plurality of MP computers collectively can perform computations to analyze the financial market data 108, generate trades, and/or perform other computing operations. In some examples, each of the plurality of MP computers associated with a market participant is connected to the cloud computing network 106.

In other examples, at least some of the plurality of MP computers are located outside of the cloud computing network 106. For example, at least some of the plurality of MP computer may be located in an on-premises data center associated with the market participant. In one example, a "front-end" MP computer is connected to the cloud computing network 106. The front-end MP receives the real-time financial market data stream 108 from the release buffer 110 and forwards the real-time financial market data stream 108 to the other MP computers that are not connected to the cloud computing network 106.

Allowing such communication naively can lead to issues of unfairness in some instances. In one example, a MP computer whose delivery clock is lagging behind could be able to receive financial market data from another MP earlier than receiving the financial market data from the CES computer 102. Since, trades are ordered based on the delivery clock, earlier access to financial market data gives a MP computer an unfair advantage over other MP computers when ordering trades via DBO. In some implementations, the cloud computing financial market system 100 can employ various constraints to prevent early access to financial market data. In one example, only the front-end MP computer is allowed to submit trade orders for the MP and other off-cloud MP computers are required to forward trades through the front-end MP computer. In another example, any data excluding the trade orders that is sent from the front-end MP computer to any other MP computer is buffered at the corresponding release buffer until the release buffer is able to determine that the delivery clocks at all other release buffers have advanced beyond a delivery clock of when the data was received. In one example, each release buffer sends periodic beacons communicating the status of its delivery clock to the other release buffers. This way each release buffer can maintain a lower bound on the delivery clocks at the other release buffers. In other examples, other restrictions can be put in place to prevent a MP computer from having early access to financial market data.

Figure 5:
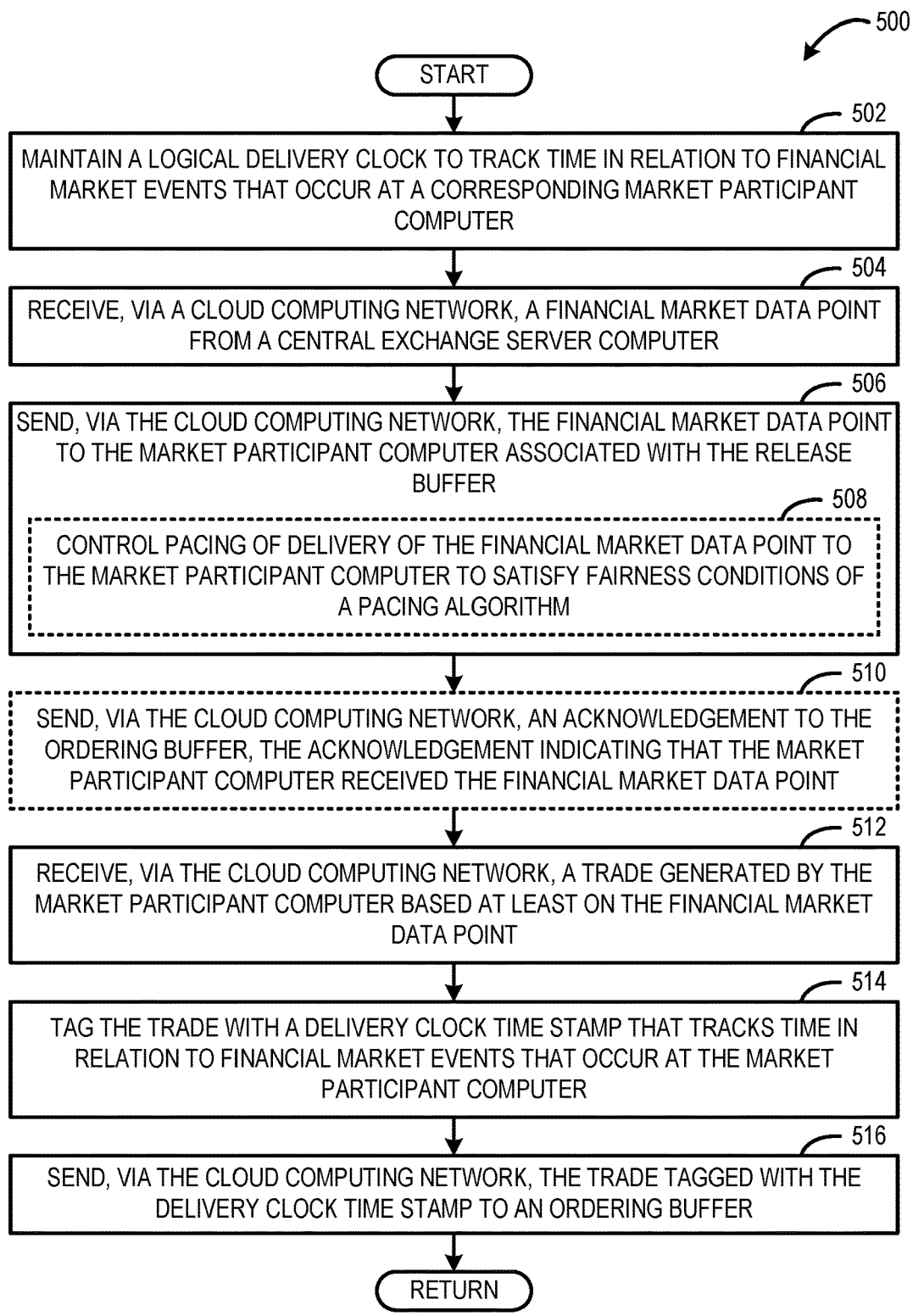
FIG. 5 shows an example method for controlling a release buffer associated with a market participant computer.

FIG. 5 shows an example method 500 for controlling a release buffer, such as any of the release buffers 110 shown in FIG. 1.

At 502, the method 500 includes maintaining a logical delivery clock to track time in relation to financial market events that occur at a corresponding release buffer.

In some implementations, the logical delivery clock of each release buffer is maintained locally at the release buffer.

At 504, the method 500 includes receiving, via a cloud computing network, a financial market data point from a central exchange server computer. At 506, the method 500 includes sending, via the cloud computing network, the financial market data point to a market participant computer associated with the release buffer. In some implementations, at 508, said sending includes controlling pacing of delivery of the financial market data point to the market participant computer to satisfy fairness conditions of a pacing algorithm.

In one example, a pacing algorithm specifies that fairness conditions are satisfied if, for a certain MP computer, the inter-delivery time for two consecutive data points (e.g., x and x+1) is greater than or equal to a threshold duration ($\delta$), then for any other MP computer, the inter-delivery for these points can differ as long as it is greater than the threshold duration ($\delta$). In some examples, a pacing algorithm specifies that data points are grouped into batches, and the inter delivery times of points within a batch is same across all MP computers. However, inter-delivery time between two consecutive batches (i.e., inter-delivery time between a last data point of batch b and a first data point of batch b+1) can differ across MP computers, the only condition is that this that this inter delivery time be greater than or equal the threshold duration. In these examples, the release buffer adjusts the pacing of delivery of consecutive financial market data points, such that the inter-delivery time is greater than the threshold duration in order to maintain fairness.

In another example, a pacing algorithm specifies that fairness conditions are satisfied if, for a certain MP computer, inter-delivery times for two consecutive data points (e.g., x and x+1) do not differ by more than a multiplicative factor of (1+E), then for any other MP computer, the inter-delivery for these points can differ as long as it is within a multiplicative factor of (1+E). In this example, the release buffer adjusts the pacing of delivery of consecutive financial market data points, such that the inter-delivery time is within the multiplicative factor of (1+E) in order to maintain fairness.

In some implementations, at 510, the method 500 includes sending, via the cloud computing network, an acknowledgement to an ordering buffer. The acknowledgement indicates to the ordering buffer that the market participant computer received the financial market data point. In some implementations, the ordering buffer sends a plurality of ordered trades to a central exchange server computer responsive to receiving acknowledgements that all market participant computers have received the financial market data point.

At 512, the method 500 includes receiving, via the cloud computing network, a trade generated by the market participant computer based at least on the financial market data point.

At 514, the method 500 includes tagging the trade with a delivery clock time stamp that tracks time in relation to financial market events that occur at a corresponding market participant computer. In some examples, the delivery clock time stamp includes a first term indicating a latest financial market data point that was delivered from the release buffer to an associated market participant computer, and a second term indicating a time interval that has elapsed since the latest financial market data point was delivered.

At 516, the method 500 includes sending, via the cloud computing network, the trade tagged with the delivery clock time stamp to an ordering buffer. The trade is one of a plurality of trades generated by a plurality of market participant computers and received by the ordering buffer. The ordering buffer orders the plurality of trades based on the delivery clock time stamps of the plurality of trades. In some examples, the ordering buffer includes a priority queue and any incoming trade received from a release buffer corresponding to a market participant computer is inserted into the priority queue ordered based on the delivery clock time stamp of the trade.

The above-described method for controlling a release buffer enables the logical delivery clock to be used to achieve response-time fairness in a cloud-hosted financial exchange in the presence of highly variable network latency.

Figure 6:
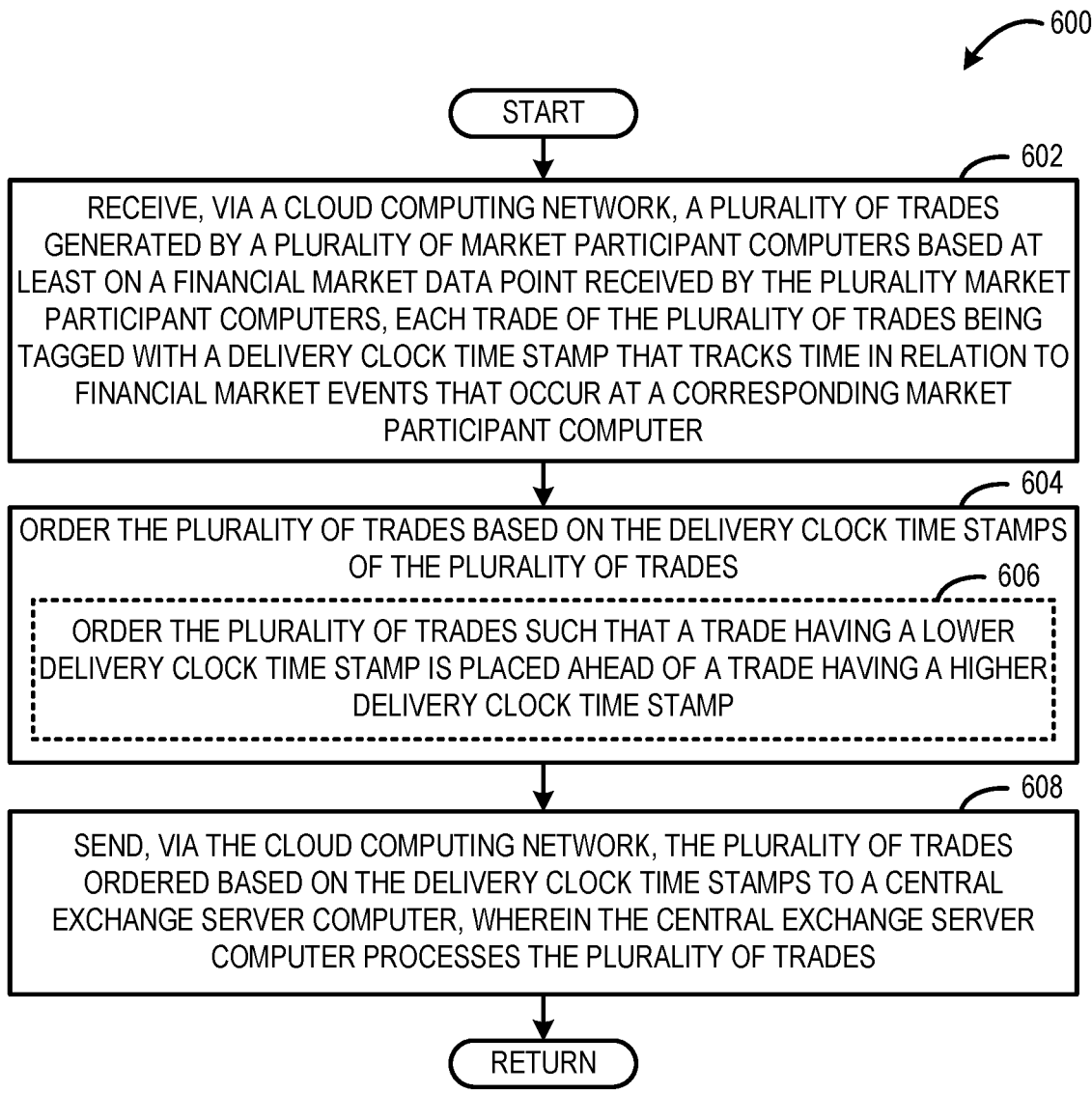
FIG. 6 shows an example delivery-time-based method for ordering trades.

FIG. 6 shows an example delivery-time-based method 600 for ordering trades. In one example, the method 600 is performed by the ordering buffer 116 shown in FIG. 1.

At 602, the method 600 includes receiving, via a cloud computing network, a plurality of trades generated by a plurality of market participant computers based at least on a financial market data point received by the plurality of market participant computers. Each trade of the plurality of trades is tagged with a delivery clock time stamp that tracks time in relation to financial market events that occur at a corresponding market participant computer. In one example, the delivery clock time stamp includes a first term indicating a latest financial market data point that was delivered to the market participant computer, and a second term indicating a time interval that has elapsed since the latest financial market data point was delivered to the market participant computer.

At 604, the method 600 includes ordering the plurality of trades based on the delivery clock time stamps of the plurality of trades. In some implementations, at 606, the method 600 includes ordering the plurality of trades such that a trade having a lower delivery clock time stamp is placed ahead of a trade having a higher delivery clock time stamp. In some examples, the ordering buffer includes a priority queue and any incoming trade received from a market participant computer is inserted into the priority queue ordered based on the delivery clock time stamp of the trade.

At 608, the method 600 includes sending, via the cloud computing network, the plurality of trades ordered based on the delivery clock time stamps to a central exchange server computer and the central exchange server computer processes the plurality of trades. In one example, a matching engine of the central exchange server processes the trades by matching buy orders against selling orders and executes matched trade orders.

The method 600 can be repeated to order trades generated for any suitable number of different financial market data points. The above-described method may be performed to fairly order financial trades in a financial exchange system that is implemented via a cloud computing network. The method recognizes that fairness is achieved by enforcing ordering of incoming trade requests based on a duration for each market participant computer to react to the financial market data.

Figure 7:
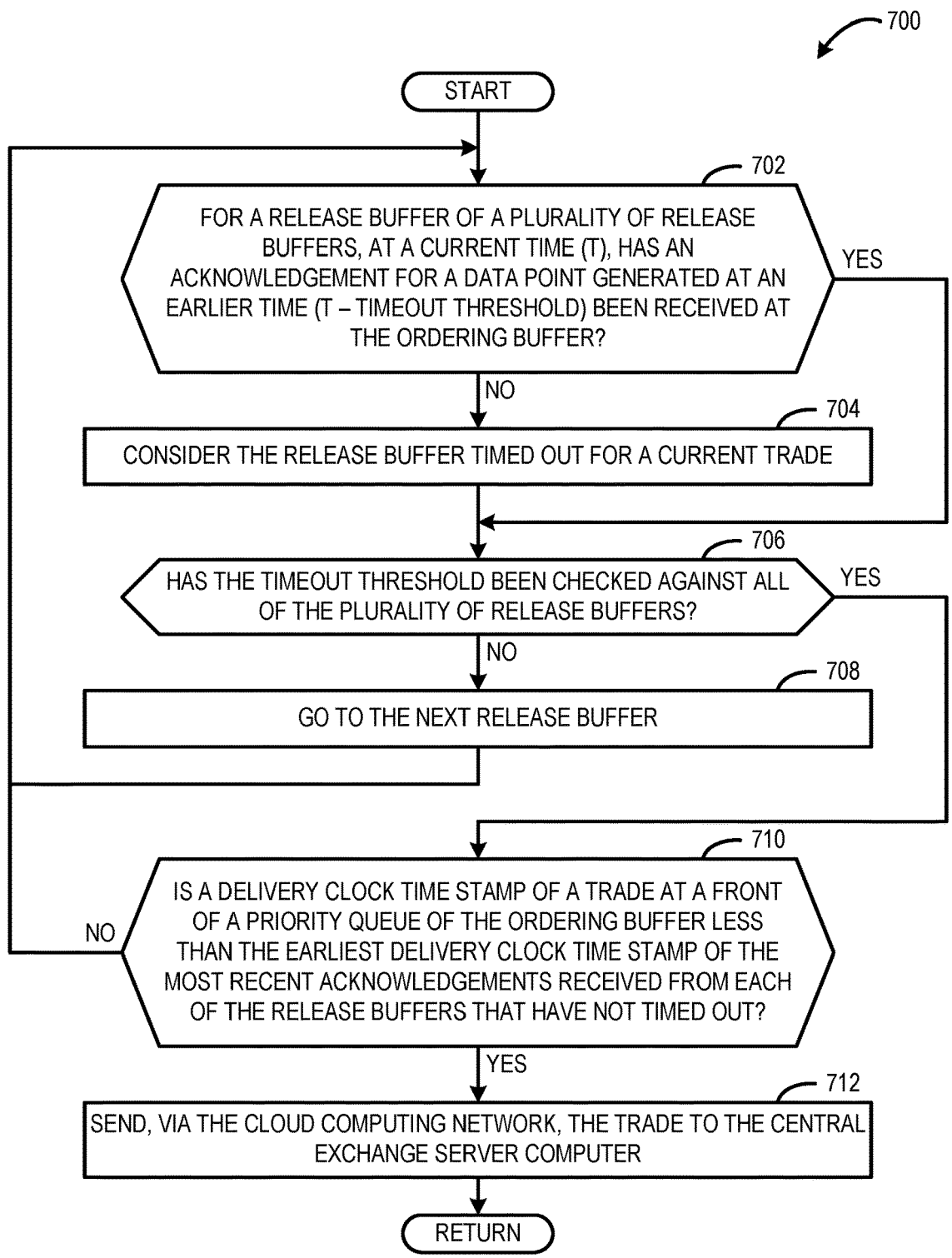
FIG. 7 shows an example method for forwarding ordered trades to a central exchange computer in a manner that accounts for variances in latency.

FIG. 7 shows an example method 700 for forwarding ordered trades in a manner that accounts for variances in latency of trades sent from different release buffers to the ordering buffer. In one example, the method 700 is performed by the ordering buffer 116 shown in FIG. 1.

At 702, the method 700 includes determining for a release buffer of a plurality of release buffers associated with different MP computers, at a current time (T), has an acknowledgement for a data point generated at an earlier time (T—a Timeout threshold) been received at the ordering buffer. The acknowledgement includes time stamp that indicates when the release buffer delivered the corresponding financial market data point to the associated market participant computer. If no acknowledgement has been received from the release buffer before the timeout threshold has elapsed since the earlier delivery clock time stamp, then at 704 the release buffer is considered timed out for a current trade and the method 700 moves to 706. Otherwise, if an acknowledgement has been received from the release buffer before the timeout threshold has elapsed, then the release buffer is still eligible (i.e., not timed out) and the method 700 moves to 706. The timeout threshold may be set to any suitable duration. The timeout threshold helps reduce buffering when the network latency is high and/or there are connection disruptions with certain market participant computers.

At 706, the method 700 includes determining if the timeout threshold has been checked against all of the plurality of release buffers. If the timeout threshold has been checked against all of the plurality of release buffers, then the method 700 moves to 710. Otherwise, at 708, the method 700 goes to the next release buffer of the plurality of release buffers and then returns to 702 to check the next release buffer against the timeout threshold.

At 710, the method 700 includes determining if a delivery clock time stamp of a trade at a front of a priority queue of the ordering buffer is less than the earliest delivery clock time stamp of the most recent acknowledgements received from each of the release buffers that have not timed out. If the delivery clock time stamp of the trade is less than the earliest delivery clock time stamp of the most recent acknowledgements received from each of the release buffers that has not timed out, then the method moves to 712. Otherwise, the method returns to 702 and waits for acknowledgements to be received from additional release buffers that have not timed out.

At 712, the method 700 includes sending, via the cloud computing network, the trade to the central exchange server computer.

The above-described method may be performed repeatedly for each trade in the priority queue of the ordering buffer. The method may be performed to fairly order financial trades in a financial exchange system that is implemented via a cloud computing network even when latency varies between different market participant computers of the financial exchange system. The method employs the timeout threshold to allow for a trade to be sent/processed even when one or more release buffers are non-responsive or otherwise severely delayed in sending an acknowledgement to the ordering buffer.

Although the delivery-time-based ordering systems and methods are discussed in the context of a cloud computing financial market system. The concepts discussed herein are broadly applicable to other types of cloud computing systems. In one example, the delivery-time-based ordering approach is employed in a cloud-based gaming application to fairly order requests generated by different gaming client computers based on receiving a data point from a gaming server computer. In one example of such a gaming implementation, release buffers are associated with the gaming client computers and an ordering buffer acts as an intermediary for fairly ordering requests that are sent to the gaming server computer to be fulfilled. In another example, delivery-time-based ordering is employed in cloud-based advertising exchange. In yet another example, delivery-time-based ordering is employed in a cloud-based auction exchange. Delivery-time based ordering may be employed in any suitable cloud computing application to maintain fairness in the presence of highly variable network latency.

The methods and processes described herein may be tied to a computing system of one or more computing devices. In particular, such methods and processes may be implemented as an executable computer-application program, a network-accessible computing service, an application-programming interface (API), a library, or a combination of the above and/or other compute resources.

Figure 8:
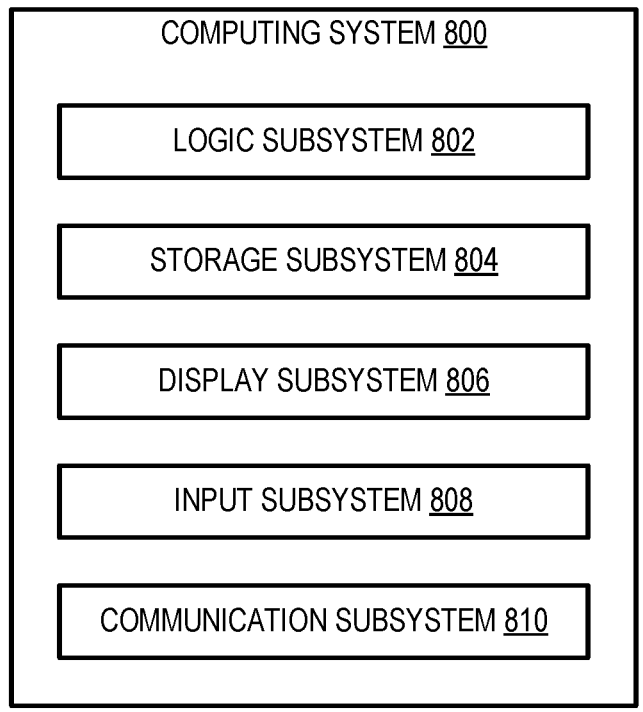
FIG. 8 shows an example computing system.

FIG. 8 schematically shows a simplified representation of a computing system 800 configured to provide any to all of the compute functionality described herein. For example, the computing system 800 may correspond to the CES computer 102, any of the MP computers 104, any of the release buffers 110, and/or the ordering buffer 116 shown in FIG. 1. Computing system 800 may take the form of one or more personal computers, network-accessible server computers, tablet computers, home-entertainment computers, gaming devices, mobile computing devices, mobile communication devices (e.g., smart phone), virtual/augmented/mixed reality computing devices, wearable computing devices, Internet of Things (IoT) devices, embedded computing devices, and/or other computing devices.

Computing system 800 includes a logic subsystem 802 and a storage subsystem 804. Computing system 800 may optionally include a display subsystem 806, input subsystem 808, communication subsystem 810, and/or other subsystems not shown in FIG. 8.

Logic subsystem 802 includes one or more physical devices configured to execute instructions. For example, the logic subsystem may be configured to execute instructions that are part of one or more applications, services, or other logical constructs. The logic subsystem may include one or more hardware processors configured to execute software instructions. Additionally or alternatively, the logic subsystem may include one or more hardware or firmware devices configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely-accessible, networked computing devices configured in a cloud-computing configuration.

Storage subsystem 804 includes one or more physical devices configured to temporarily and/or permanently hold computer information such as data and instructions executable by the logic subsystem. When the storage subsystem includes two or more devices, the devices may be collocated and/or remotely located. Storage subsystem 804 may include volatile, nonvolatile, dynamic, static, read/write, read-only, random-access, sequential-access, location-addressable, file-addressable, and/or content-addressable devices. Storage subsystem 804 may include removable and/or built-in devices. When the logic subsystem executes instructions, the state of storage subsystem 804 may be transformed—e.g., to hold different data.

Aspects of logic subsystem 802 and storage subsystem 804 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem and the storage subsystem may cooperate to instantiate one or more logic machines. As used herein, the terms "machine" (e.g., attribution machine, well being assessment machine, and mitigation machine) and machine learning model (e.g., user interaction model, user productivity model, camera usage model, empathy model, facial expression model, and location model) are used to collectively refer to the combination of hardware, firmware, software, instructions, and/or any other components cooperating to provide computer functionality. In other words, "machines" and "models" are never abstract ideas and always have a tangible form. A machine and/or model may be instantiated by a single computing device, or a machine may include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality may optionally be saved as one or more unexecuted modules on one or more suitable storage devices.

When included, display subsystem 806 may be used to present a visual representation of data held by storage subsystem 804. This visual representation may take the form of a graphical user interface (GUI). Display subsystem 806 may include one or more display devices utilizing virtually any type of technology. In some implementations, display subsystem may include one or more virtual-, augmented-, or mixed reality displays.

When included, input subsystem 808 may comprise or interface with one or more input devices. An input device may include a sensor device or a user input device. Examples of user input devices include a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 810 may be configured to communicatively couple computing system 800 with one or more other computing devices. Communication subsystem 810 may include wired and/or wireless communication devices compatible with one or more different communication protocols. The communication subsystem may be configured for communication via personal-, local-, wide-area, and/or cloud computing networks.

This disclosure is presented by way of example and with reference to the associated drawing figures. Components, process steps, and other elements that may be substantially the same in one or more of the figures are identified coordinately and are described with minimal repetition. It will be noted, however, that elements identified coordinately may also differ to some degree. It will be further noted that some figures may be schematic and not drawn to scale. The various drawing scales, aspect ratios, and numbers of components shown in the figures may be purposely distorted to make certain features or relationships easier to see.

In an example, a computer-implemented method comprises receiving, via a cloud computing network, a plurality of trades generated by a plurality of market participant computers based at least on a financial market data point received by the plurality of market participant computers, each trade of the plurality of trades being tagged with a delivery clock time stamp that tracks time in relation to financial market events that occur at a corresponding market participant computer, ordering the plurality of trades based on the delivery clock time stamps of the plurality of trades, and sending, via the cloud computing network, the plurality of trades as ordered based on the delivery clock time stamps to a central exchange server computer, the central exchange server computer processes the plurality of trades. In this example and/or other examples, the plurality of trades may be ordered such that a trade having a lower delivery clock time stamp is placed ahead of a trade having a higher delivery clock time stamp. In this example and/or other examples, the delivery clock time stamp may include a first term indicating a latest financial market data point that was delivered to the market participant computer, and a second term indicating a time interval that has elapsed since the latest financial market data point was delivered to the market participant computer. In this example and/or other examples, a plurality of release buffers connected to the cloud computing network may be associated with the plurality of market participant computers, each release buffer may maintain a logical delivery clock to track time in relation to financial market events that occur at the release buffer, and the release buffer may generate delivery clock time stamps for trades received from an associated market participant computer. In this example and/or other examples, each release buffer may control pacing of delivery of the financial market data point to the associated market participant computer to satisfy fairness conditions of a pacing algorithm. In this example and/or other examples, the fairness conditions of the pacing algorithm may be satisfied if an inter-delivery time for two consecutive financial market data points is greater than or equal to threshold duration. In this example and/or other examples, the computer-implemented method may further comprise receiving, via the cloud computing network, a plurality of acknowledgements from release buffers that have delivered the financial market data point to associated market participant computers, and a trade at a front of a priority queue of the ordering buffer may be sent to the central exchange server computer based on the trade having a delivery clock time stamp that is less than an earliest delivery clock time stamp of the plurality of acknowledgements. In this example and/or other examples, the computer-implemented method may further comprise for each release buffer of the plurality of release buffers, determining that the release buffer is timed out if, for a current time (T), an acknowledgement has not been received from the release buffer for a financial market data point generated at an earlier time that is less than the current time by a timeout threshold (T-Timeout threshold), and the trade at the front of the priority queue of the ordering buffer may be sent to the central exchange server computer based on the trade having a delivery clock time stamp that is less than an earliest delivery clock time stamp of the most recent acknowledgements received from each of the release buffers that have not timed out. In this example and/or other examples, the logical delivery clock of each release buffers may be maintained locally at the release buffer.

In another example, a computing device comprises a release buffer associated with a market participant computer, the release buffer being configured to maintain a logical delivery clock to track time in relation to financial market events that occur at the release buffer, receive, via a cloud computing network, a financial market data point from a central exchange server computer, send, via the cloud computing network, the financial market data point to the market participant computer, receive, via the cloud computing network, a trade generated by the market participant computer based at least on the financial market data point, tag the trade with a delivery clock time stamp that tracks time in relation to financial market events that occur at the corresponding market participant computer, and send, via the cloud computing network, the trade tagged with the delivery clock time stamp to an ordering buffer, the trade is one of a plurality of trades generated by a plurality of market participant computers and received by the ordering buffer, and the ordering buffer orders the plurality of trades based on the delivery clock time stamps of the plurality of trades. In this example and/or other examples, the delivery clock time stamp may include a first term indicating a latest financial market data point that was delivered from the release buffer to the market participant computer, and a second term indicating a time interval that has elapsed since the latest financial market data point was delivered to the market participant computer. In this example and/or other examples, the release buffer may be configured to control pacing of delivery of the financial market data point to the associated market participant computer to satisfy fairness conditions of a pacing algorithm. In this example and/or other examples, the fairness conditions of the pacing algorithm may be satisfied if an inter-delivery time for two consecutive financial market data points is greater than or equal to threshold duration. In this example and/or other examples, the release buffer may be configured to, based on sending the financial market data point to the market participant computer, send, via the cloud computing network, an acknowledgement to the ordering buffer, the ordering buffer may send a trade at a front of a priority queue of the ordering buffer to the central exchange server computer based on the trade having a delivery clock time stamp that is less than an earliest delivery clock time stamp of a plurality of acknowledgements received from different release buffers associated with different market participant computers. In this example and/or other examples, the logical delivery clock of each release buffer may be maintained locally at the release buffer. In this example and/or other examples, the release buffer may be incorporated into a programmable network interface card of the computing device.

In yet another example, a computer-implemented method comprises receiving, via a cloud computing network, a plurality of requests generated by a plurality of computers based at least on a data point received by the plurality computers, each request of being tagged with a delivery clock time stamp that tracks time in relation to events that occur at a corresponding computer, ordering the plurality of requests based on the delivery clock time stamps of the plurality of requests, and sending, via the cloud computing network, the plurality of requests as ordered based on the delivery clock time stamps to a server computer, and the server computer fulfills the plurality of requests. In this example and/or other examples, the delivery clock time stamp may include a first term indicating a latest data point that was delivered to the market participant computer, and a second term indicating a time interval that has elapsed since the latest financial market data point was delivered to the market participant computer. In this example and/or other examples, a plurality of release buffers connected to the cloud computing network may be associated with the plurality of computers, each release buffer may maintain a logical delivery clock to track time in relation to events that occur at the release buffer, and the release buffer may generate delivery clock time stamps for requests received from an associated computer. In this example and/or other examples, the computer-implemented method may further comprise receiving, via the cloud computing network, a plurality of acknowledgements from release buffers that have delivered the data point to associated computers, and a request at a front of a priority queue of the ordering buffer may be sent to the server computer based on the request having a delivery clock time stamp that is less than an earliest delivery clock time stamp of the plurality of acknowledgements.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computer-implemented method comprising:
receiving, via a cloud computing network, a plurality of trades generated by a plurality of market participant computers based at least on a financial market data point received by the plurality of market participant computers, wherein a plurality of release buffers connected to the cloud computing network are associated with the plurality of market participant computers, wherein each release buffer of the plurality of release buffers maintains a logical delivery clock to track time in relation to financial events that occur at the release buffer, wherein each release buffer of the plurality of release buffers is configured to control pacing of delivery of the financial market data point to the associated market participant computer to satisfy fairness conditions of a pacing algorithm that specifies 1) sending the financial market data point to the associated market participant computer if an inter-delivery time for two consecutive financial market data points is greater than or equal to a threshold duration, and 2) holding the financial market data point if the inter-delivery time for two consecutive financial market data points is less than the threshold duration, and wherein each release buffer of the plurality of release buffers is configured to generate delivery clock time stamps for trades received from the associated market participant computer, such that each trade of the plurality of trades is being tagged with a delivery clock time stamp that specifies a response time for a corresponding market participant computer to generate the trade after receiving the financial market data point from the release buffer;
ordering the plurality of trades based on the delivery clock time stamps of the plurality of trades, such that each trade having an earlier delivery clock time stamp indicating a shorter response time is placed ahead of every other trade having a later delivery clock time stamp indicating a longer response time; and
sending, via the cloud computing network, the plurality of trades as ordered based on the delivery clock time stamps to a central exchange server computer, wherein the central exchange server computer processes the plurality of trades.

2. The computer-implemented method of claim 1, wherein the delivery clock time stamp includes a first term indicating a latest financial market data point that was delivered to the market participant computer, and a second term indicating a time interval that has elapsed since the latest financial market data point was delivered to the market participant computer.

3. The computer-implemented method of claim 1, further comprising:
receiving, via the cloud computing network, a plurality of acknowledgements from release buffers that have delivered the financial market data point to associated market participant computers, and wherein a trade at a front of a priority queue of the ordering buffer is sent to the central exchange server computer based on the trade having a delivery clock time stamp that is less than an earliest delivery clock time stamp of the plurality of acknowledgements.

4. The computer-implemented method of claim 3, further comprising:

for each release buffer of the plurality of release buffers, determining that the release buffer is timed out if, for a current time (T), an acknowledgement has not been received from the release buffer for a financial market data point generated at an earlier time that is less than the current time by a timeout threshold (T—Timeout threshold), and wherein the trade at the front of the priority queue of the ordering buffer is sent to the central exchange server computer based on the trade having a delivery clock time stamp that is less than an earliest delivery clock time stamp of the most recent acknowledgements received from each of the release buffers that have not timed out.

5. The computer-implemented method of claim 1, wherein the logical delivery clock of each release buffers is maintained locally at the release buffer.

6. A computing device comprising:

a logic subsystem; and a storage subsystem holding instructions executable by the logic subsystem to execute a release buffer associated with a market participant computer, the release buffer being configured to:

maintain a logical delivery clock to track time in relation to financial market events that occur at the release buffer;

receive, via a cloud computing network, a financial market data point from a central exchange server computer;

send, via the cloud computing network, the financial market data point to the market participant computer;

based on sending the financial market data point to the market participant computer, send, via the cloud computing network, an acknowledgement to an ordering buffer, wherein the acknowledgement is tagged with a delivery clock time stamp generated by the logical delivery clock;

receive, via the cloud computing network, a trade generated by the market participant computer based at least on the financial market data point;

tag the trade with a delivery clock time stamp generated by the logical delivery clock that specifies a response time for a corresponding market participant computer to generate the trade after receiving the financial market data point; and send, via the cloud computing network, the trade tagged with the delivery clock time stamp to the ordering buffer, wherein the trade is one of a plurality of trades generated by a plurality of market participant computers and received by the ordering buffer, wherein the ordering buffer is configured to order the plurality of trades in a priority queue based on the delivery clock time stamps of the plurality of trades and based on receiving acknowledgements for the plurality of trades, such that each trade having an earlier delivery clock time stamp indicating a shorter response time is placed ahead of every other trade having a later delivery clock time stamp indicating a longer response time in the priority queue, and wherein the ordering buffer is configured to send a trade at a front of the priority queue to the central exchange server computer based on the trade having a delivery clock time stamp that is earlier than an earliest delivery clock time stamp for a plurality of acknowledgements generated based on the financial market data point received from different release buffers associated with different market participant computers.

7. The computing device of claim 6, wherein the delivery clock time stamp includes a first term indicating a latest financial market data point that was delivered from the release buffer to the market participant computer, and a second term indicating a time interval that has elapsed since the latest financial market data point was delivered to the market participant computer.

8. The computing device of claim 6, wherein the release buffer is configured to control pacing of delivery of the financial market data point to the associated market participant computer to satisfy fairness conditions of a pacing algorithm.

9. The computing device of claim 8, wherein the fairness conditions of the pacing algorithm are satisfied if an inter-delivery time for two consecutive financial market data points is greater than or equal to a threshold duration.

10. The computing device of claim 6, wherein the logical delivery clock of each release buffer is maintained locally at the release buffer.

11. The computing device of claim 6, wherein the release buffer is incorporated into a programmable network interface card of the computing device.

12. A computing system comprising:

an ordering buffer executed by a first computing device connected to a cloud computing network; and a release buffer executed by a second computing device connected to the cloud computing network and associated with a market participant computer, the release buffer being configured to:

maintain a logical delivery clock to track time in relation to financial market events that occur at the release buffer;

receive, via the cloud computing network, a financial market data point from a central exchange server computer;

send, via the cloud computing network, the financial market data point to the market participant computer;

receive, via the cloud computing network, a trade generated by the market participant computer based at least on the financial market data point;

tag the trade with a delivery clock time stamp generated by the logical delivery clock that specifies a response time for a corresponding market participant computer to generate the trade after receiving the financial market data point, wherein the delivery clock time stamp includes a first term indicating a latest financial market data point that was delivered from the release buffer to the market participant computer, and a second term indicating a time interval that has elapsed since the latest financial market data point was delivered to the market participant computer; and send, via the cloud computing network, the trade tagged with the delivery clock time stamp to the ordering buffer; and wherein the ordering buffer is configured to:

receive a plurality of trades generated by a plurality of market participant computers based at least on the market data point, wherein the plurality of trades includes the trade sent from the release buffer;

order the plurality of trades based on the delivery clock time stamps of the plurality of trades, such that each trade having an earlier delivery clock time stamp indicating a shorter response time is placed ahead of every other trade having a later delivery clock time stamp indicating a longer response time; and send, via the cloud computing network, the plurality of trades as ordered based on the delivery clock time stamps to the central exchange server computer, wherein the central exchange server computer is configured to process the plurality of trades in order.

13. The computing system of claim 12, wherein the release buffer is configured to control pacing of delivery of the financial market data point to the associated market participant computer to satisfy fairness conditions of a pacing algorithm.

14. The computing system of claim 13, wherein the fairness conditions of the pacing algorithm are satisfied if an inter-delivery time for two consecutive financial market data points is greater than or equal to a threshold duration.

15. The computing system of claim 12, wherein the ordering buffer is further configured to:

receive, via the cloud computing network, a plurality of acknowledgements from a plurality of release buffers that have delivered the financial market data point to a corresponding plurality of associated market participant computers, and wherein a trade at a front of a priority queue of the ordering buffer is sent to the central exchange server computer based on the trade having a delivery clock time stamp that is less than an earliest delivery clock time stamp of the plurality of acknowledgements.

16. The computing system of claim 15, wherein the ordering buffer is further configured to:

for each release buffer of the plurality of release buffers, determine that the release buffer is timed out if, for a current time (T), an acknowledgement has not been received from the release buffer for a financial market data point generated at an earlier time that is less than the current time by a timeout threshold (T—Timeout threshold), and wherein the trade at the front of the priority queue of the ordering buffer is sent to the central exchange server computer based on the trade having a delivery clock time stamp that is less than an earliest delivery clock time stamp of most recent acknowledgements received from each of the release buffers that have not timed out.

* * * * *